United States Patent Office

3,279,305
Patented Oct. 18, 1966

3,279,305
OPTICAL TURBIDIMETER
Akinori Muta, Yasuhiko Uehara, and Nobuo Saito, Tokyo-to, Japan, assignors to Kabushiki Kaisha Hitachi Seisakusho, Tokyo-to, Japan, a joint-stock company of Japan
Filed Mar. 21, 1962, Ser. No. 181,317
6 Claims. (Cl. 88—14)

This invention relates to turbidimeters, and more particularly it relates to a new and improved optical turbidimeter with highly desirable features.

When a suspension consisting of fine solid particles dispersed uniformly in a liquid is left undisturbed, the suspended particles settle with the elapsed time in accordance with Stoke's law, and the concentration of the particles at each point in the suspension varies progressively. It is known that, in the above case, by measuring the variation with time of the particle concentration at a point of a certain depth from the suspension surface, obtaining a graphical curve indicating the relation between the particles concentration at that point and time, and analyzing this curve by a known method, it is possible to determine the particle size distribution of the fine particles being tested.

Heretofore, as apparatuses based on the above-described principle, those depending on the weighing method and those depending on the optical method have been most widely used.

In the case of apparatuses of the above-mentioned weighing method, the procedure comprises placing one of the balance pans of a weighing balance at a point of a certain depth in the suspension, measuring the variation of weight of the particles settling onto the said pan by measuring the variation of balance weight added to the other balance pan to preserve equilibrium, obtaining a weight versus time curve, and obtaining the particle size distribution by a known method from this curve. However, since this method, as mentioned above, is a gravimetric method, it requires a relatively large quantity of specimen sample. At the same time, this method has the further disadvantage of requiring a considerable along measuring time since it entails the measurement of variation with time of the weight of the settling particles.

In the case of apparatuses of the afore-mentioned optical method, the procedure comprises placing a suspension throughout which a fine particle sample is uniformly dispersed in a cell having transparent and mutually parallel side walls, passing a thin light beam through the parallel side walls of the said cell perpendicularly thereto and at a point of a certain depth from the suspension surface, receiving the transmitted light by means of a photoelectric element connected to a suitable recorder which is so adapted as to plot a curve indicating the relation between the output of the said photoelectric element, that is, the transmitted light intensity, and the time of sedimentation, the photoelectric output of the said element varying with time in accordance with the sedimentation of the particles, and finally analyzing this curve by a known method to obtain the particle size distribution of the fine particle sample. However, this method also has the disadvantage of requiring a considerably long time for measurement since it entails the measurement of variation with time of the particle concentration at a point of a certain depth in a suspension, the said variation being due to the sedimentation of the fine particles.

It is an object of the present invention to provide an optical turbidimeter in which the above-mentioned disadvantages of known apparatuses are eliminated.

More specifically, it is an object of the invention to provide a new apparatus of simple construction by means of which the particle concentration distribution in a suspension of fine particles can be measured in a short time and with the use of an extremely small sample quantity.

In seeking to achieve the foregoing objects, the present inventors have carried out pertinent measurements relative to the sedimentation of fine particles in a suspension and have conducted various theoretical studies relating to the methods of determining the particle size distributions of the fine particles. As a result, it has been discovered that it is possible to determine the particle size distribution of the fine particles also by measuring the particle concentration distribution in a suspension at any arbitrary time subsequent to the commencement of sedimentation of the said fine particles, instead of measuring the variation with time of the particle concentration at a point of a certain depth in the suspension as in the case of known methods. The present invention is based on the principle of this discovery.

Briefly described in general terms, the objects of this invention may be achieved by placing a suspension containing uniformly dispersed fine particles in a cell having transparent, mutually parallel, planar, side walls; causing a thin light beam which is constantly perpendicular to the said parallel walls of the cell to undergo a scanning motion at constant speed in the direction perpendicular to the suspension surface, in as short a time as possible, beginning at any arbitrary time subsequent to the commencement of sedimentation of the fine particles; receiving the transmitted light by means of a photoelectric element; and causing the curve indicating the relation between the photoelectric output of the said element, that is, the intensity of transmitted light, and the depth from the suspension surface to appear on a suitable recording means, for example, a cathode-ray tube.

The nature and details of the invention will be more clearly apparent by reference to the following description of one representative embodiment when taken in conjunction with the accompanying drawing in which.

Figure 1:
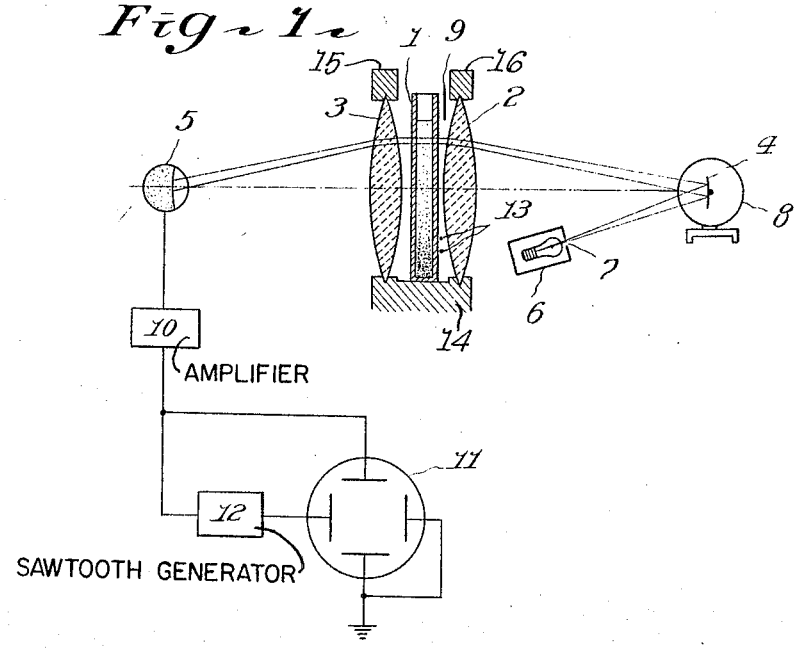
FIG. 1 is a schematic diagram showing the embodiment.

Referring to FIG. 1, a suspension containing a uniformly dispersed fine particle sample is placed in a cell 1 which has transparent, mutually-parallel, planar, side walls. Lenses 2 and 3 are disposed coaxially on opposite sides of the cell 1 and lie in planes parallel to the said parallel side walls. They are set in the casing of the device, parts of which are shown in the drawing as 14, 15 and 16, respectively. A rotating concave mirror 4 is disposed at the outer focal point of the lens 2, and a photoelectric element 5, such as a photoelectric tube, is disposed at the outer focal point of the lens 3.

A light projector 6 provided with a slit 7 is so disposed as to project a thin light beam horizontally to the rotating concave mirror 4, by which the light beam is reflected toward the lens 2, by which it is directed in the horizontal direction and, becoming a light beam which is parallel to the suspension surface in the cell 1, passes through the suspension and through the lens 3 to be projected onto a certain surface of the photoelectric element 5. Since, for this operation, the light beam which scans the suspension is required to be a thin light beam, the apparatus is so adapted that an image of the slit 7 is formed exactly at the central part of the cell 1.

The embodiment is further provided with a screen plate 9 for screening the suspension scanning above the suspension surface and a recording system comprising an amplifier 10, a cathode-ray tube 11, and a synchronous saw-tooth generator 12 for horizontal sweep, the said recording system being connected as shown. Two opaque, thin lines 13, spaced 1 cm. apart are fastened onto the front face of the cell 1 so as to function as base datum lines for determining depths from the suspension surface.

When the concave mirror 4 is rotated at constant speed by a motor 8, the suspension in the cell 1 is continuously scanned at a constant speed in the vertical direction by a thin light beam which is parallel to the suspension surface. The light which has been transmitted through the cell 1 enters the photoelectric element 5, thereby causing photoelectric output to be generated. This output is amplified by the amplifier 10 and is introduced into the vertical sweeping axis of the cathode-ray tube 11. Then, by synchronizing the rotational speed of the aforesaid motor 8, that is, the scanning velocity of the light beam scanning the cell 1, and the horizontal sweeping velocity of the cathode-ray tube 11, it is possible to obtain on the screen of the cathode-ray tube 11 the desired curve indicating the relation between the photoelectric output, that is, the intensity of the transmitted light, and the depth from the suspension surface.

Figure 2:
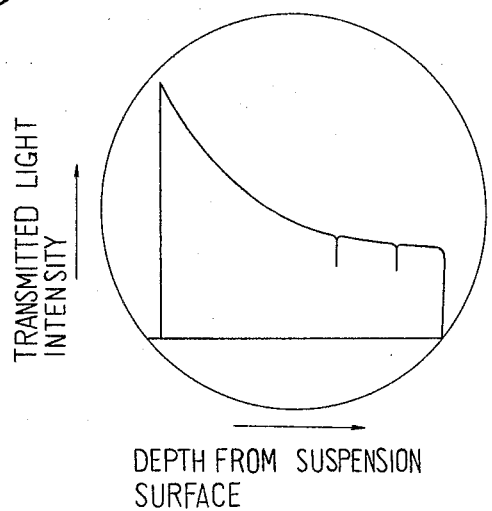
FIG. 2 is a front elevational view showing on example of a curve of concentration distribution of fine particles caused to appear on a cathode-ray tube by the apparatus of the present invention.

In conducting a measurement, a suitable quanity of a fine particle sample is first placed in a suspension within the cell 1, and the suspension is stirred thoroughly. After the sample has been dispersed uniformly, the measurement is begun. Since the particles progressively settle with the passage of time, the image produced on the screen of the cathode-ray tube varies accordingly. At an arbitrary time after commencement of sedimentation of the particles, a curve indicating the relation between the intensity of transmitted light and the depth from the suspension surface, as shown in FIG. 2, is obtained on the cathode-ray tube. By analyzing this curve, the particle size distribution of the sample is obtained.

In the curve shown in FIG. 2, the intensity of transmitted light is shown to drop abruptly at two points. These drops are due to the thin, opaque lines 13 fastened as base datum lines for determining depths from the suspension surface, and the distance between the two points of drop represents 1 cm.

In order to indicate more specifically the effectiveness and advantages of the turbidimeter according to the present invention, the results of measurements conducted on carborundum particles and particles of a fluorescent material by means of an apparatus according to the present invention and by means of an apparatus based on the weighing method are presented below.

| Sample | Specific Gravity | Mean Radius, μ | Apparatus of This Invention | | Apparatus based on Weighing Method | |
|---|---|---|---|---|---|---|
| | | | Sample Weight, mg. | Measurement Time, min. | Sample Weight, grams | Measurement Time, hr. |
| Carborundum | 3.12 | 3.5 | 45-60 | 2-3 | 9 | 2-4 |
| Fluorescent Substance | 3.18 | 5 | 65-85 | 50-70 | 9 | 1-2 |

As is apparent from the results tabulated above, the apparatus of the present invention enables measurements to be made in an extremely short time which is 1/40 or smaller fraction of the time required by a weighing method apparatus. Moreover, the sample quantity used by the apparatus of this invention is 1/100 or smaller fraction of that required by a weighing method apparatus. Similarly, the measurement time required by the apparatus according to the present invention is also a fraction of that required by conventional optical methods.

Actual measurements of particle size distributions of various powders, such as, for example, graphite, carborundum, and fluorescent materials, produced results which were found to be in good agreement with results obtained by measurements conducted on the same materials by means of an apparatus based on the weighing method.

While, in the above-described recording apparatus, a cathode-ray tube is used, and its horizontal sweep caused to correspond to the constant-speed rotation of a rotating light source and to be effected by a saw-tooth voltage from a power source which is entirely independent of the said light source, it is also possible to cause this horizontal sweep to be effected by the voltage from a power source which operates cooperatively with the rotating light source.

Although the foregoing disclosure has described the nature of the present invention with respect to two representative embodiments thereof, the present invention is, of course, not to be limited by the details presented therein since it can be made to undergo many modifications and changes of detail and some modifications of general arrangement within limits as defined in the appended claims.

Moreover, while the foregoing disclosure has described the invention for the case wherein it is applied to the measurement of particle size distribution of fine particles, it will be apparent from the said disclosure that the present invention can be applied also to such measurements as that of the concentration distribution within a solution at a certain instant of time or that the state of distribution of opaque powder with which a transparent material is filled.

What is claimed is:

1. An optical turbidimeter comprising, in combination, a cell for holding a suspension whose turbidity is to be measured, said cell having two transparent, mutually parallel, planar walls; a first lens disposed on one side of, and near, said cell, parallel to said walls; a rotating light projector disposed at the outer focal point of said first lens; a second lens disposed on the opposite side of, and near, said cell, parallel to said walls and coaxial with said first lens; a photoelectric element disposed at the outer focal point of said second lens; recording means actuated by said photoelectric element; said recording means recording the intensity of the light transmitted through the cell as a function of the angular position of the rotating light projector.

2. An optical turbidimeter comprising, in combination, a cell for holding a suspension whose turbidity is to be measured, said cell having two transparent, mutually parallel, planar walls; two opaque lines, spaced approximately 1 cm. apart from each other, attached to the front face of said cell and serving as base datum lines for the determination of depths from the surface of said suspension; a first lens disposed on one side of, and near, said cell, parallel to said walls; a screen plate interposed between said lens and said cell; a concave mirror rotating at a constant speed disposed at the outer focal point of said lens; a light source having a narrow slit so as to emit a thin beam of light disposed below, and at an angle to, said mirror; a second lens disposed on the opposite side of, and near, said cell, parallel to said walls and coaxial with said first lens; a photoelectric element disposed at the outer focal point of said second lens; recording means actuated by the output of said photoelectric element, consisting essentially of an amplifier, a synchronous generator and a reading instrument; said thin light beam being reflected by said mirror through said lens and screen plate, passing through said suspension parallel to its surface thus scanning the suspension, through said second lens and onto said photoelectric element causing the generation of a photoelectric output proportional to the intensity of the light transmitted through said cell; said recording means recording said intensity as a function of the angular position of the rotating light projector.

3. In an optical turbidimeter having a cell holding a suspension whose turbidity is to be measured, a light source and a recording device, the improvements which comprise, in combination, said cell having two transparent, mutually parallel planar walls; two opaque lines, spaced approximately 1 cm. from each other, attached to the front of said cell serving as base datum lines for the determination of depths from the surface of said suspension; a first lens disposed on one side of, and near, said cell, parallel to said walls; a screen plate interposed between said cell and said lens; a concave mirror rotating at constant speed disposed at the outer focal point of said lens; said light source being provided with a narrow slit so as to emit a thin beam of light, said light source being disposed below, and at an angle to, said mirror; a second lens disposed on the opposite side of said cell, parallel to said walls and coaxial with said first lens; a photoelectric element disposed at the outer focal point of said second lens; said thin light beam being reflected by said mirror through said first lens and screen plate, passing through said suspension parallel to its surface thus scanning the suspension, through said second lens and onto said photoelectric element cauing the generation of a photoelectric output proportional to the intensity of the light transmitted through said cell; said recording device recording said intensity as a function of the angular position of the rotating light projector.

4. In an optical turbidimeter having a cell holding a suspension whose turbidity is to be measured, a light source, a photoelectric cell and a recording device, the improvement which comprise, in combination, said cell having two transparent, mutually parallel, planar walls; two opaque lines, spaced approximately 1 cm. apart from each other, attached to the front of said cell serving as base datum lines for the determination of depths from the surface of said suspension; a first lens disposed on one side of, and near, said cell, parallel to said walls; a screen plate interposed between said cell and said lens; a single concave mirror rotating at constant speed disposed at the outer focal point of said lens; said light source being provided with a narrow slit so as to emit a thin beam of light, said light source being disposed below, and at an angle to, said mirror; a second lens disposed at the opposite side of said cell, parallel to said walls and coaxial with said first lens; said photoelectric cell being disposed at the outer focal point of said second lens; said thin light beam being reflected by said mirror through said first lens and screen plate, passing through said suspension parallel to its surface thus scanning the supension, through said second lens and onto said photoelectric element causing the generation of a photoelectric output proportional to the intensity of the light transmitted through said cell; said recording device recording said intensity as a function of the angular position of the rotating light projector.

5. An optical turbidimeter according to claim 1 wherein a rotating mirror is used as the said rotating light projector.

6. An optical turbidimeter according to claim 2 wherein a cathode-ray tube is used as the said reading instrument.

References Cited by the Examiner
UNITED STATES PATENTS

| | | | |
|---|---|---|---|
| 2,104,525 | 1/1938 | Proskouriakoff | 73—290 X |
| 2,192,580 | 3/1940 | Sachtleben | 88—14 |
| 2,282,741 | 5/1942 | Parker. | |
| 2,514,260 | 7/1950 | Rosen | 73—61 |
| 2,713,263 | 7/1955 | Turner | 73—290 |
| 2,884,783 | 5/1959 | Spengler et al. | 88—14 X |
| 2,982,170 | 5/1961 | Wyss | 88—1 X |
| 2,991,688 | 7/1961 | Schneider | 88—14 |
| 3,009,388 | 11/1961 | Polanyi | 73—61 X |
| 3,046,554 | 7/1962 | Brumley | 88—14 X |

JEWELL H. PEDERSEN, *Primary Examiner.*

T. L. HUDSON, *Assistant Examiner.*